(No Model.)
W. W. HINKLE & I. H. GAITHER.
DOUBLE SHOVEL CULTIVATOR.
No. 491,176. Patented Feb. 7, 1893.
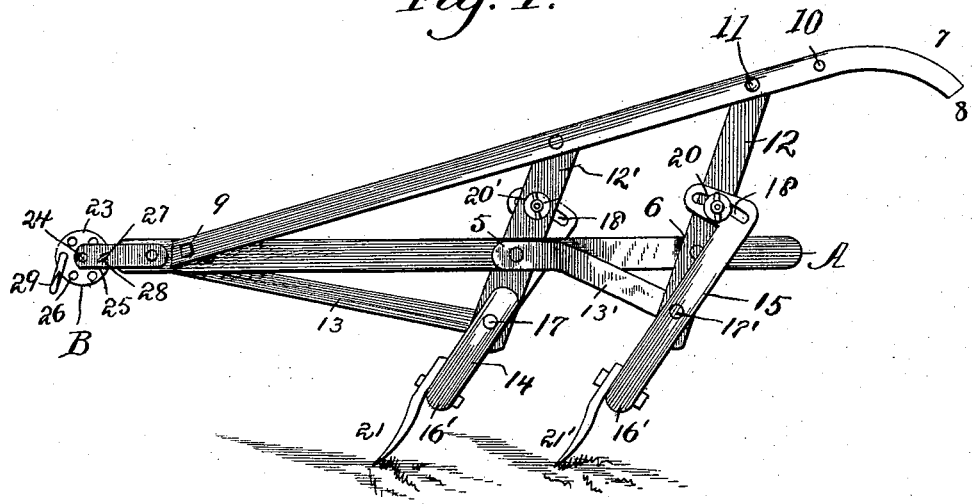
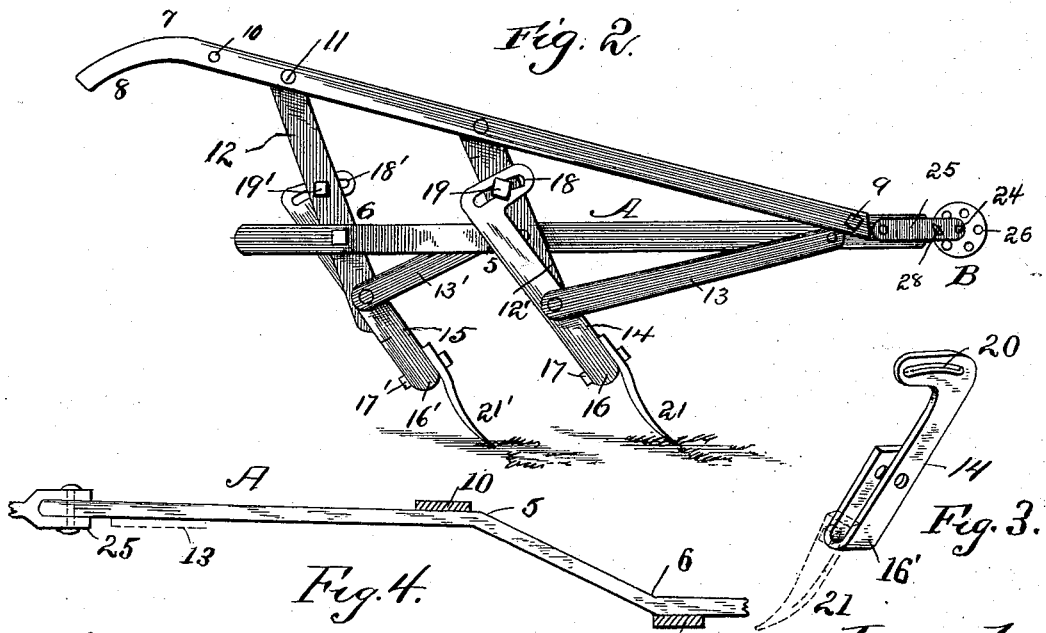
Witnesses:
J. B. McGirr.
M. L. Moran.
Inventors.
Ira H Gaither
Wilber W Hinkle
By N. W. Fitzgerald & Co.
attys

UNITED STATES PATENT OFFICE.

WILBER WASHINGTON HINKLE, OF HOOD'S MILLS, AND IRA HERMAN GAITHER, OF COCKEYSVILLE, MARYLAND.

DOUBLE-SHOVEL CULTIVATOR.

SPECIFICATION forming part of Letters Patent No. 491,176, dated February 7, 1893.

Application filed June 25, 1892. Serial No. 438,015. (No model.)

*To all whom it may concern:*

Be it known that we, WILBER WASHINGTON HINKLE, residing at Hood's Mills, in the county of Carroll, and IRA HERMAN GAITHER, residing at Cockeysville, in the county of Baltimore, State of Maryland, citizens of the United States, have invented certain new and useful Improvements in Double-Shovel Cultivators, of which the following is a specification, reference being had therein to the accompanying drawings.

The object of our invention is to provide a strong double shovel cultivator of light weight and inexpensive in construction, the shovel of which may be adjusted at a desired inclination within defined limits, and to otherwise provide an improved cultivator as hereinafter set forth and claimed.

In the drawings: Figure 1, is a side elevation of our device, and Fig. 2, is an elevation of the side opposite to that shown in Fig. 1. Fig. 3 is a detail of the shovel carriers. Fig. 4 is a detail plan view of the beam.

Like characters of reference denote the same parts throughout the several views.

The beam of our cultivator, A, is constructed of wrought iron and is curved laterally at the points 5 and 6, for the purpose of affording an opportunity to attach the shovels so that they will not track. The handles 7 and 8, are of wood, or other suitable material and are attached at their lower ends near the forward end of the beam at the point designated 9, so as to afford the operator the best control of the beam in front of the shovels. The handles are braced by the metallic bars 10. For the purpose of supplying a handhold between the handles the wooden cross piece 11 is provided. Metallic standards 12, 12', rigidly attached to the handles and the beam, and stayed by the metallic braces 13, 13', afford means for attachment of the adjustable shovel carriers 14, 15. The shovel carriers are constructed of wrought iron, having the loop 16, 16', at their lower extremity for the reception of the shovels, they are pivoted to the lower end of the standards 12, 12', at 17, 17', and are provided with slots 18, 18', located in their outwardly curved upper extremity. Within these slots are located the threaded bolts, 19, 19', having the finger nuts 20, 20' for rigidly holding the shovel-carriers in any desired position permitted by the extent of the slots. The shovels, 21, 21', are located upon and suitably attached to the lower extremities of the shovel carriers. In operation the shovel carriers and attached shovels may be adjusted at any desired angle of inclination permitted by the extent of slots, 18, 18', by loosening the finger nuts, making the desired adjustment by swinging the shovels forward or backward as desired and then tightening the finger-nuts, which bear against the washer 22, 22'.

The clevis, B, is constructed of a disk 23, having the center 24 within the bifurcated disk holder 25, located upon the outer end of the beam. The disk 23 is provided with openings 26 near its outer edge which conform to opening 27 in the holder through which clevis pin 28 passes. The single tree is attached to hook 29. It is plain that the depth at which the cultivator will run will be regulated within the diameter of the disk by the adjustment of the clevis in the desired disk opening.

Having thus fully described our invention what we claim as new and desire to secure by Letters-Patent, is:

A double shovel cultivator having a laterally curved beam for the attachment of shovels to avoid tracking in combination with shovel carriers having loops at their lower extremities and adjustable in slots at their outwardly curved upper extremities, finger nuts within the slots for holding the shovel carriers in the position desired, handles attached to the beam near its forward end and to the upper end of the standards, supporting the shovel carriers, braces extending from the beam to the supporting standards and the supporting standards, substantially as described.

In testimony whereof we affix our signatures in presence of two witnesses.

WILBER WASHINGTON HINKLE.
IRA HERMAN GAITHER.

Witnesses as to the signature of W. W. Hinkle:
THOMAS H. HUNT,
T. H. HUNT, Jr.

Witnesses as to the signature of I. H. Gaither:
HARRY M. GAITHER,
JAMES KELLEY.